(12) United States Patent
Gregotski et al.

(10) Patent No.: US 9,317,188 B2
(45) Date of Patent: Apr. 19, 2016

(54) DEVICES AND METHODS FOR PROVIDING NAVIGATION IMAGES ASSOCIATED WITH ADAPTIVE BIT RATE VIDEO CONTENT

(71) Applicant: General Instrument Corporation, Horsham, PA (US)

(72) Inventors: Mark Gregotski, Jamison, PA (US); Gary Hughes, Chelmsford, MA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 477 days.

(21) Appl. No.: 13/841,569

(22) Filed: Mar. 15, 2013

(65) Prior Publication Data

US 2014/0282262 A1    Sep. 18, 2014

(51) Int. Cl.
  *H04N 5/92*      (2006.01)
  *G06F 3/0484*    (2013.01)
  *H04N 21/2387*   (2011.01)
  *H04N 21/262*    (2011.01)
  *H04N 21/442*    (2011.01)
  *H04N 21/845*    (2011.01)
  *H04N 21/854*    (2011.01)
  *H04N 21/8549*   (2011.01)

(52) U.S. Cl.
  CPC .......... *G06F 3/0484* (2013.01); *H04N 21/2387* (2013.01); *H04N 21/26258* (2013.01); *H04N 21/44209* (2013.01); *H04N 21/8456* (2013.01); *H04N 21/8549* (2013.01); *H04N 21/85406* (2013.01)

(58) Field of Classification Search
  CPC ................. H04N 21/2387; H04N 21/26258; H04N 21/44209; H04N 21/85406; H04N 21/8549; H04N 21/8456; G06F 3/0484
  USPC ........................................... 386/239; 715/838
  See application file for complete search history.

(56) References Cited

U.S. PATENT DOCUMENTS

| | | | |
|---|---|---|---|
| 7,152,209 B2 | 12/2006 | Jojic et al. | |
| 2002/0116402 A1* | 8/2002 | Luke | 707/200 |
| 2004/0032968 A1* | 2/2004 | Andrew et al. | 382/100 |
| 2008/0154974 A1* | 6/2008 | Obata et al. | 707/200 |
| 2008/0195746 A1* | 8/2008 | Bowra et al. | 709/231 |
| 2009/0044128 A1* | 2/2009 | Baumgarten et al. | 715/738 |
| 2009/0089056 A1* | 4/2009 | Fujii | 704/246 |
| 2009/0300204 A1* | 12/2009 | Zhang et al. | 709/231 |
| 2011/0188439 A1* | 8/2011 | Mao et al. | 370/312 |
| 2015/0185992 A1* | 7/2015 | Ofstad et al. | 386/241 |

\* cited by examiner

*Primary Examiner* — William Tran
(74) *Attorney, Agent, or Firm* — Thomas A. Ward

(57) ABSTRACT

Systems and methods that improve navigation within video content in an adaptive streaming environment are provided herein.

19 Claims, 8 Drawing Sheets

DEVICES AND METHODS FOR PROVIDING NAVIGATION IMAGES ASSOCIATED WITH ADAPTIVE BIT RATE VIDEO CONTENT

FIELD

The present invention relates generally to video display and specifically to an improved system, device and method for navigation within video content in an adaptive streaming environment.

BACKGROUND

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs. For example, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Digital technology also permitted the dissemination and playback of media programs via the Internet, with improved signal processing. These methods of dissemination and playback have become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidth and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players generally do not rely on buffering to provide random access to any point in the media program. Instead, this may be accomplished through the use of control messages transmitted from the media player to the streaming media server. Consequently, when a user wishes to move to a particular point in a program (e.g., such as by moving along the progress bar or slider), the program may be paused while the request from the user is processed. During the program pause (e.g., while the user is trying to manipulate the program), the slider or progress bar will often show images that have been pre-assigned or tagged as indicative of a chapter in the media program, however these tagged or chapter images are not necessarily accurate in time to the particular point in the program the user wishes to view.

Adaptive Bit Rate (ABR) streaming is a technology that combines aspects of streaming and progressive download to provide streaming of media content by breaking the content into a sequence of small HTTP-based file segments, each segment containing a short interval of playback time of a content that is potentially many hours in duration, such as a movie or the live broadcast of a sports event. An ABR player provides streaming playback by requesting an appropriate series of segments as determined by a manifest or playlist file and user requests, such as play, pause, rewind, etc. For example, the user may use HTTP Get or Byterange requests to obtain such media segments.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

BRIEF SUMMARY

Figure 1A:
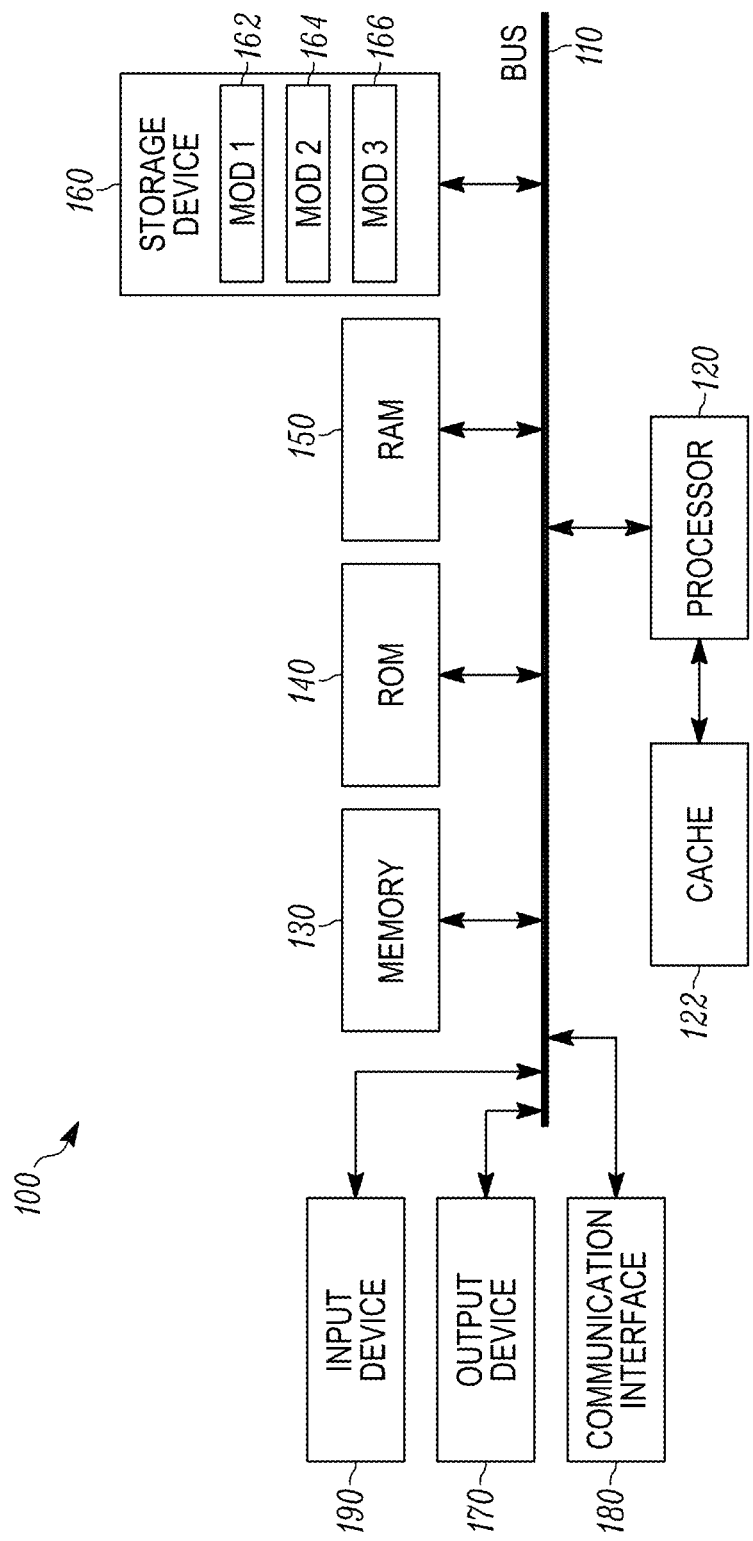
FIG. 1A illustrates an example system implementation in which embodiments of the disclosure may be used.

Accordingly, there is provided herein systems and methods that improve navigation within video content in an adaptive streaming environment.

In a first aspect, a method is disclosed, the method comprising: receiving a top level manifest file for a media asset; selecting a media segment file having a predetermined bitrate from the top level manifest file; receiving a first collection of thumbnail images corresponding to the media segment file, the first collection of thumbnail images corresponding to images that coarsely represent chapters throughout the duration of the media segment file; and receiving a second collection of thumbnail images corresponding to the media segment file, the second collection of thumbnail images corresponding to images that more finely represent chapters throughout the duration of the media segment file, wherein the first collection and second collection of thumbnail images are received at different times. In an embodiment of the first aspect, a tag in the top level manifest file indicates if the first collection of thumbnail images is available. In an embodiment of the first aspect, the method further comprises: pairing each thumbnail image within the first collection of thumbnail images with a time offset or a segment number corresponding to a media segment starting point. In an embodiment of the first aspect, each thumbnail image is paired using a uniform resource locator (URL) for the thumbnail image. In an embodiment of the first aspect, the pairing is performed using a look-up table. In an embodiment of the first aspect, said receiving the second collection of thumbnail images is performed as a background task when processor capacity is available. In an embodiment of the first aspect, the first collection of thumbnail images comprises a collection of 100 thumbnail images that span from the beginning of the media segment to the end of the media segment. In an embodiment of the first aspect, the second collection of thumbnail images comprises a collection of thumbnail images that are periodically spaced at a time interval corresponding to a duration of corresponding media files, the thumbnail images spanning from the beginning to the end of an entire audiovisual media. In an embodiment of the first aspect, the first collection and second collection of thumbnail images are compressed using a standard format. In an embodiment of the first aspect, the method further comprising: receiving a third collection of thumbnail images corresponding to the media segment file, the third collection of thumbnail images corresponding to images that more finely represent chapters throughout the duration of the media segment file.

In a second aspect, a system is disclosed, the system comprising: an adaptive bitrate (ABR) player configured to: receive a top level manifest file for a media asset; select a media segment file having a predetermined bitrate from the top level manifest file; receive a first collection of thumbnail images corresponding to the media segment file, the first collection of thumbnail images corresponding to images that coarsely represent chapters throughout the duration of the media segment file; and receive a second collection of thumbnail images corresponding to the media segment file, the second collection of thumbnail images corresponding to images that more finely represent chapters throughout the duration of the media segment file, wherein the first collection and second collection of thumbnail images are received at different times. In an embodiment of the second aspect, the ABR player is further configured to: perform bandwidth availability estimation prior to selecting a media segment file having a predetermined bitrate. In an embodiment of the second aspect, the ABR player is further configured to: receive a second level manifest file for the media asset. In an embodiment of the second aspect, the ABR player is further configured to: determine the media segment file from the second level manifest file. In an embodiment of the second aspect, the ABR player is further configured to: receive multiple media files in succession. In an embodiment of the second aspect, the ABR player is further configured to: determine if bandwidth availability changes and adjusting media file segment selection based on available bandwidth. In an embodiment of the second aspect, the ABR player is further configured to: recognize a tag in the top level manifest file, wherein the tag indicates that thumbnail images are available for retrieval. In an embodiment of the second aspect, the system further comprises: an image handler in communication with the ABR player, the image handler configured to: recognize a tag in the top level manifest file, wherein the tag indicates that thumbnail images are available for retrieval. In an embodiment of the second aspect, the image handler is further configured to: decompress the first collection and second collection of thumbnail images. In an embodiment of the second aspect, the system further comprises: an application graphic user interface (GUI) in communication with the ABR player, the GUI configured to: provide a progress bar and playback location indicator to a user.

DETAILED DESCRIPTION

Reference will now be made in detail to implementations of the present disclosure. Each example is provided by way of explanation of the disclosure only, not as a limitation of the disclosure. It will be apparent to those skilled in the art that various modifications and variations can be made in the present disclosure without departing from the scope or spirit of the disclosure. For instance, features described as part of one implementation can be used on another implementation to yield a still further implementation. Thus, it is intended that the present disclosure cover such modifications and variations that come within the scope of the disclosure.

With reference to FIG. 1A, an exemplary system 100 includes a general-purpose computing device 100, including a processing unit (CPU or processor) 120 and a system bus 110 that couples various system components including the system memory 130 such as read-only memory (ROM) 140 and random-access memory (RAM) 150 to the processor 120. The system 100 can include a cache 122 of high-speed memory connected directly with, in close proximity to, or integrated as part of the processor 120. The system 100 may be configured to copy data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions.

Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general-purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160, such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although some implementations employ the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement, and therefore, the basic features here may easily be substituted for improved hardware or firmware arrangements as they are developed.

For clarity of explanation, the illustrative system embodiment is presented as including individual functional blocks, including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as equivalent to software executing on a general-purpose processor. For example the functions of one or more processors presented in FIG. 1A may be provided by a single shared processor or multiple processors. Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry, in combination with a general purpose DSP circuit, may also be provided.

The logical operations of the various embodiments may be implemented as: (1) a sequence of computer implemented steps, operations, or procedures (generally "instructions") running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1A can practice all or part of the disclosed methods, and/or can be a part of the disclosed systems, and/or can operate according to instructions in the disclosed computer-readable storage media. Such logical operations can be implemented as modules configured to control the processor 120 to perform particular functions according to the programming of the module. For example, FIG. 1A illustrates three modules Mod1 162, Mod2 164 and Mod3 166 which are modules configured to control the processor 120. These modules may be stored on the storage device 160 and loaded into RAM 150 or memory 130 at runtime, or may be stored as would be known in the art in other computer-readable memory locations.

Content delivery describes the delivery of media "content" such as audio or video or computer software and games over a delivery medium such as broadcasting or the Internet. Content delivery generally has two parts: delivery of finished content for digital distribution, with its accompanying metadata; and delivery of the end product to the end-user.

As used herein, "streaming media" is media that is received by and presented to an end-user while being delivered by a streaming provider using Adaptive Bit Rate streaming methods. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using Adaptive Bit Rate methods will be referred to as "media" and "streaming."

Adaptive Bit Rate (ABR) streaming is a technology that works by breaking the overall media stream into a sequence of small HTTP-based file downloads, each download loading one short segment of an overall potentially unbounded transport stream. As the stream is played, the client (e.g., the media player) may select from a number of different alternate streams containing the same material encoded at a variety of data rates, allowing the streaming session to adapt to the available data rate. At the start of the streaming session, the player downloads/receives a manifest containing the metadata for the various sub-streams which are available. Since its requests use only standard HTTP transactions, Adaptive Bit Rate streaming is capable of traversing a firewall or proxy server that lets through standard HTTP traffic, unlike UDP-based protocols such as RTP. This also allows a content delivery network (CDN) to readily be implemented for any given stream. ABR streaming methods have been implemented in proprietary formats including HTTP Live Streaming (HLS) by Apple, Inc and HTTP Smooth Streaming by Microsoft, Inc. ABR streaming has been standardized as ISO/IEC 23009-1, Information Technology—Dynamic adaptive streaming over HTTP (DASH): Part 1: Media presentation description and segment formats.

An increasing number of video playback devices, such as the Apple iPad, prefer video content to be delivered via ABR streaming rather than streamed continuously. The iPad, using Apple's HLS format, receives the manifest as an m3u8 file that contains links, media uniform resource identifiers (URIs), to each of the segments or "chunks" of video content, and processes the manifest file to retrieve and play back each media segment in turn. However, the m3u8 format imposes several limitations, including the inability to embed other manifest files. This inability to embed other manifest files in the m3u8 format is a hurdle to delivering advertisements and other dynamic interstitial content in streaming video to such devices. In this disclosure, HLS represents the range of protocols that media segment content and employ a playlist/manifest file to manage playback.

Figure 1B:
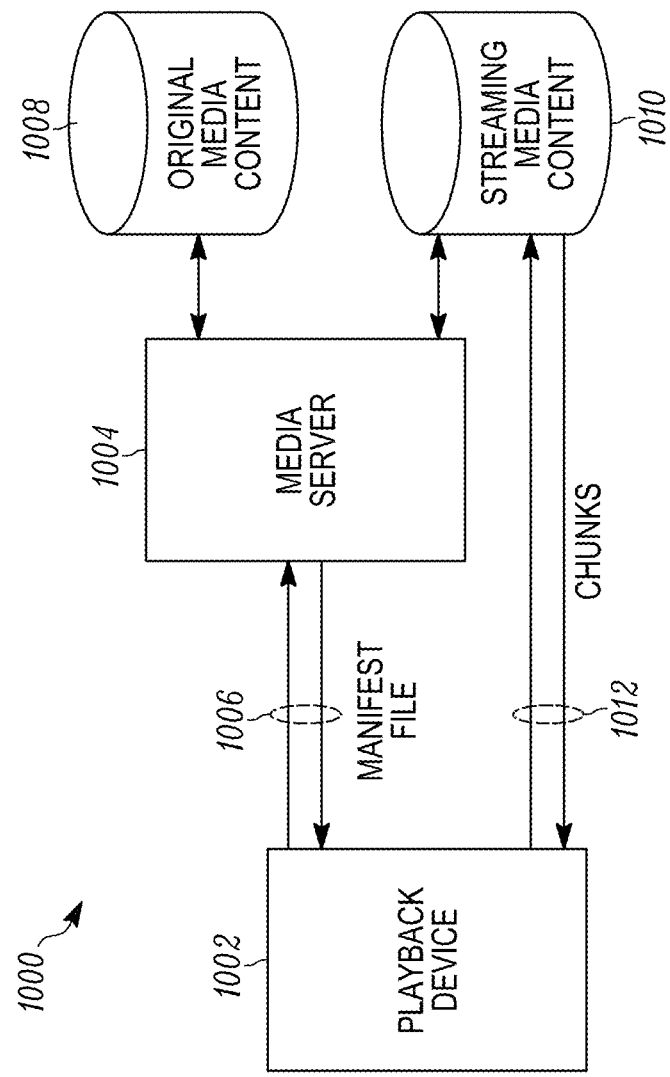
FIG. 1B illustrates an example media streaming system implementation in which embodiments of the disclosure may be used.

Having disclosed some components of a computing system, the disclosure now turns to FIG. 1B, which illustrates an example media streaming system embodiment 1000. The communications between the entities depicted in FIG. 1B can occur via one or more wired or wireless networks. Further, the devices can communicate directly, via the World Wide Web, or via an application programming interface (API). A playback device 1002, such as a tablet device, smartphone, desktop or portable computer, set-top box, Internet-enabled television, media center PC, or any other suitable device, first makes a request to a media server 1004 for playback of media content, such as an episode of Star Trek. Typically, the media server 1004 resides in a network, such as the Internet, for example a third-party content distribution network such as Akami or Limelight.

In HLS, the media server 1004 receives the request and generates or fetches a manifest file 1006 to send to the playback device 1002 in response to the request. Example formats for the manifest file 1006 include the m3u and m3u8 formats. An m3u8 file is a specific variation of an m3u encoded using UTF-8 Unicode characters. The m3u file format was initially used in the WINAMP Media Player for only audio files, but has since become a de facto playlist standard on many media devices for local and/or streaming media, including music and other media types. Many media devices employ variations of the m3u file format, any of which can be used according to the present disclosure. A manifest file can include links to media files as relative or absolute paths to a location on a local file system, or as a network address, such as a URI path. The m3u8 format is used herein as a non-limiting example to illustrate the principles of manifest files including non-standard variants.

The manifest file 1006 includes a list of Uniform Resource Locators (URLs) to different representations of the requested segmented media content. Before or at the time of the request, the media server 1004 generates or identifies the media segments of the requested media content as streaming media content 1010. The media segments of the streaming media content 1010 are generated, either by the media server 1004, the content producer, or some other entity, by splitting the original media content 1008. Upon receiving the manifest file 1006, the playback device 1002 can fetch a first media segment for playback from the streaming media content 1010, and, during playback of that media segment, fetch a next media segment for playback after the first media segment, and so on until the end of the media content.

Figure 2:
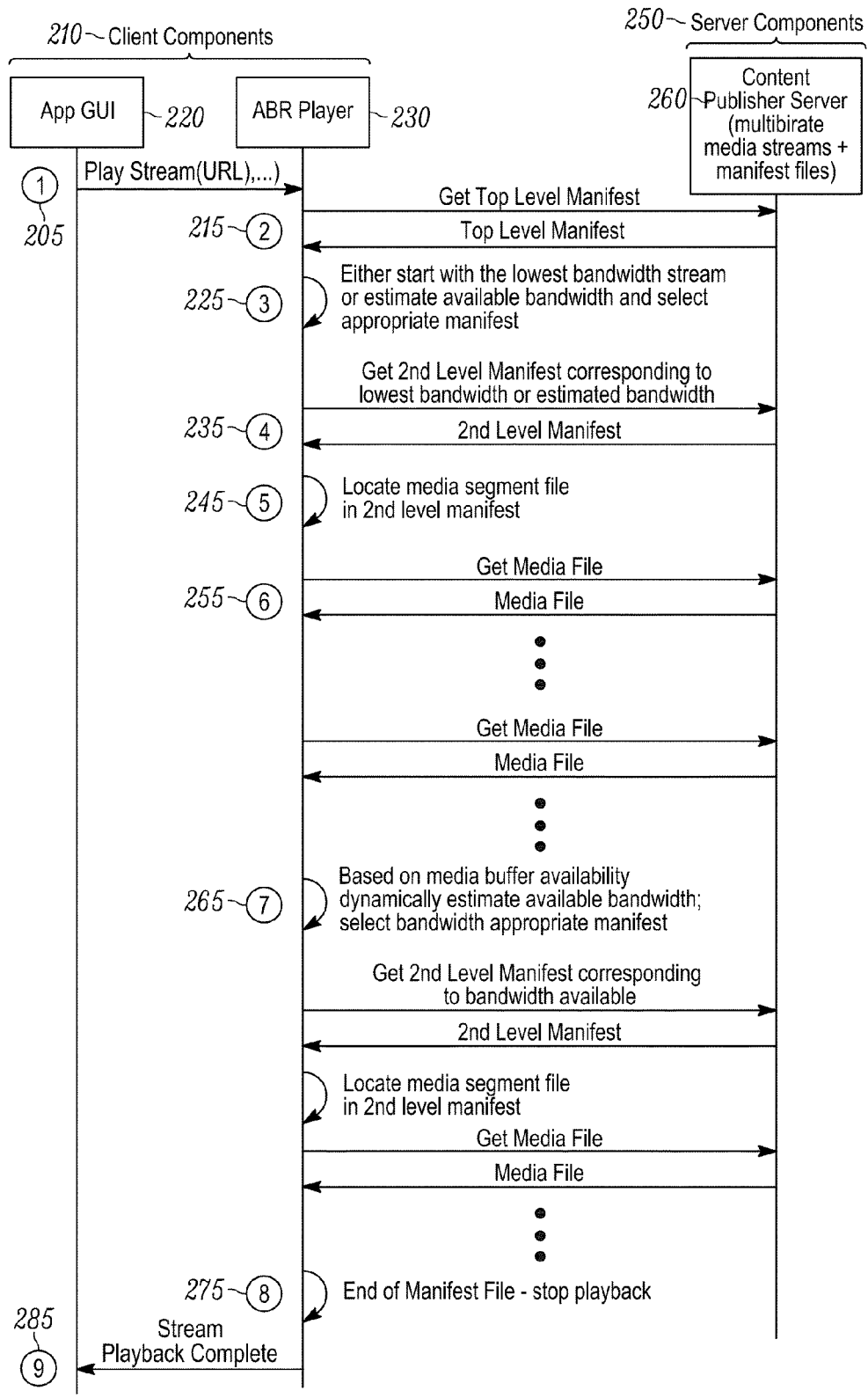
FIG. 2 illustrates a system that includes client components and server components in communication with each other and the message flows for typical adaptive streaming in accordance with embodiments of the disclosure.

Referring to FIG. 2, a system 200 is shown that includes client components 210 and server components 250 in communication with each other and the message flows for typical adaptive streaming. Flows related to security between the client components 210 and server components 250 have been omitted for clarity.

Client components may include an application graphic user interface (App GUI) 220 and adaptive bitrate (ABR) player 230. Server components 250 may include a content publishing server 260, which may be configured to store or produce multi-bitrate media steams and manifest files.

In a first step 205, a user navigates through movie listing and selects an audiovisual media asset for viewing. In some embodiments, the audiovisual media asset is linked to a uniform resource locator (URL) pointing to a high level playlist.

In a next step 215, the ABR player 230 may be configured to request/receive a top or high level manifest file for the audiovisual media asset that includes information about the ABR profiles and links to the manifests corresponding to each media bandwidth.

In a next step 225, the ABR player 230 may be configured to look at the high level manifest and either starts by requesting the lowest bandwidth manifest file or optionally may do some bandwidth availability estimation and select the corresponding bandwidth manifest file.

In a next step 235, ABR player 230 may be configured to request/receive a 2nd level manifest for the corresponding bandwidth. In a next step 245, ABR player 230 may be configured to determine the media segment file in the 2nd level manifest.

In a next step 255, ABR player 230 may be configured to request/receive media segment files in succession. In a next step 265, ABR player 230 may be configured to continuously monitor the media buffer fullness to determine if it is necessary to request lower or higher bandwidth media segment representations. For example, if the bandwidth conditions change, the player may be configured to select the corresponding bandwidth manifest file and select media segments in succession.

In a next step 275, when the end of the manifest file is reached, ABR player 230 may be configured to signal the App GUI 220 that playback of the audiovisual media asset is complete. Thus signaling that the stream playback is complete is shown as step 285.

Figure 3A:
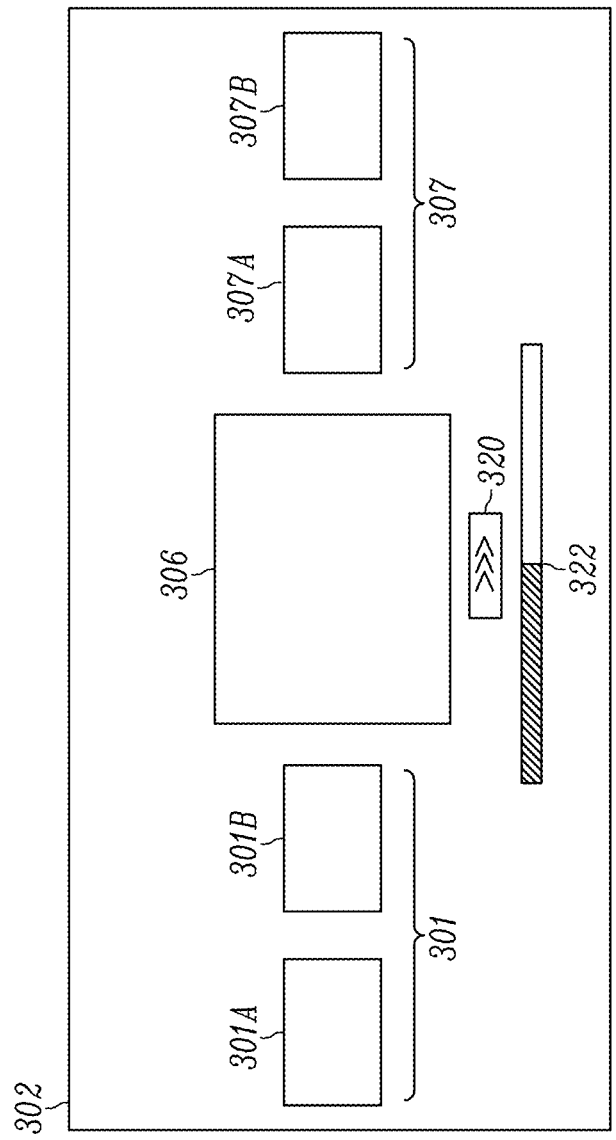
FIG. 3A illustrates a display of multiple still images from an audiovisual media.

FIG. 3A illustrates an example display of multiple still images from an audiovisual media. As shown, there are two still images in a first image position, one still image in a second image position, and two still images in a third image position, as displayed in a video display for use in trick play of streaming media. Each of the still images is, for example, a JPG still graphical image and is not displayed directly from the video stream for the program. It should be appreciated that FIG. 3 is provided to describe an overview of using a slider and/or progress bar and show an example of how still image data may be presented to a user.

In an embodiment, a screen display 302 on a video monitor or similar device may comprise a first image position 301 comprising one or more still images 301A, 301B, a second image position 306 comprising one still image, and a third image position 307 comprising one or more other still images 307A, 307B. Image position 301, 306, and 307 display still images that were generated from the audiovisual media. The still images are displayed in sequential order as they appear in the audiovisual media with the first or earliest images in position 301 and last or later images in position 307. The screen display 302 also may comprise a movement icon 320 and a progress bar 322.

In an embodiment, a streaming media processor (e.g., processor 120 which is typically part of playback device 1002) displays screen display 302 in response to user input from input device (e.g., playback device 1002) requesting a navigation or seek function. For example, assume that a user is viewing a movie using the playback device 1002 and a streaming video protocol and then presses a "fast forward' button on playback device 1002 or selects and drags the slider of a media player application. In response to this action, the streaming media processor 120 changes the display to show screen display 302. The streaming media processor 120 no longer displays the streaming media but displays a set of still images 301, 306, 307 that have been sampled from the movie or program in the form represented in screen display 302. In an embodiment, a full-screen full-motion display of the audiovisual media is changed to screen display 302 which shows five (5) of the still images in successive positions 401, 406, 407. Further, the images in display 302 move successively from right to left as fast forward control proceeds. In one embodiment the streaming video is frozen and the still image or images 301, 306, 307 are overlaid on top of the frozen video, which may be darkened or dimmed to emphasize the overlaid stills.

In one embodiment, media processor 120 displays screen display 302 in response to the user selecting and dragging the slider of a media player application. In response to this action, the media player application replaces or overlays the display, which generates and sends a forward or rewind command to processor 120 depending on the direction the slider is moved. In response to the forward or rewind command, the media player application replaces or overlays the display of the streaming media with a set of still images representing the content of the program at a time point close to that represented by the position of the slider. Further, images in display 302 may move successively from right to left or left to right as the user continues to drag the slider forward or backward. When the user releases the slider, or pauses dragging the slider for a period of time, the media processor 120 may begin to re-buffer the content at the time point close to that represented by the position of the slider. When a sufficient portion of the media at the new time point is buffered the media processor 120 replaces the displayed still images with playback of the buffered content. The thumbnail image displayed based on the last position of the slider may have a time offset corresponding to the start of a media segment file that can be retrieved by the ABR player from the content server, to begin playback at the desired location.

While FIG. 3A illustrates a screen display comprising three images positions 301, 306, and 307, the screen display may comprise more than three image positions or less than three image positions. For example, screen display 302 may comprise a single image position comprising one of the still images. Continuing the example, as a forward or back command is received by media processor 120 the displayed still image is replaced with a sequentially adjacent still image from still images (e.g., the next nearest still image to the time point of the replaced still image in the time direction of the navigation or seek operation).

Figure 3B:
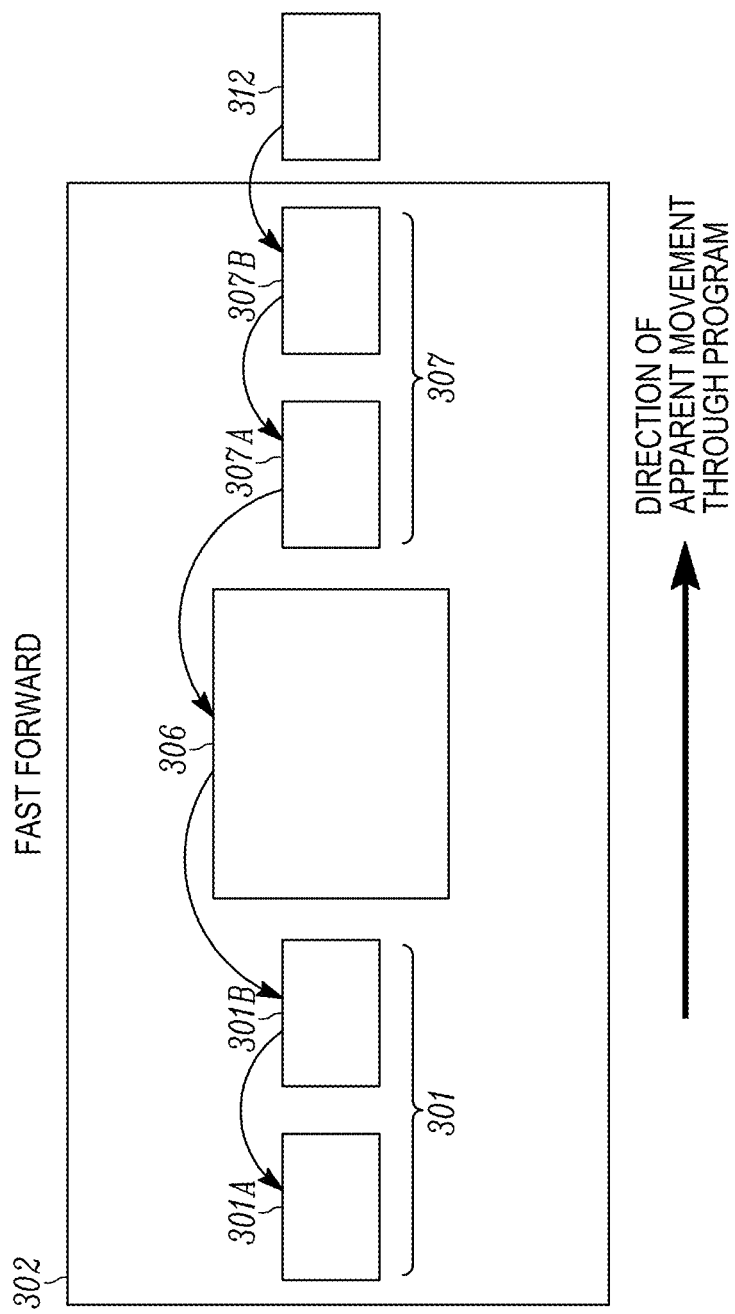
FIG. 3B illustrates movement of the still images of FIG. 3A in a fast forward operation.

Referring now to FIG. 3B, during a fast forward operation, image 301A disappears and appears to have moved off the screen to the left. Image 301B replaces image 301A and concurrently the image in position 306 moves leftward to position 301 to replace image 301B. Image 307A moves leftward into the second position 301. Image 307B moves leftward to replace image 307A. A new image 312 from among the previously downloaded still images replaces the image 307B. As a result, the user appears to be moving through the program at fast forward speed in the direction indicated by the arrow at the bottom of FIG. 3B. The process, however, does not involve displaying the audiovisual media using a streaming media protocol, but rather involves successively displaying the separately received still images in successively different positions on the screen, and concurrently moving the images to their new positions, to provide an illusion of rapidly moving through the streaming data of the audiovisual media.

In an embodiment, repeated selection of a fast forward button or rewind button on playback device 1002 causes the system to toggle through successive still images and thus the user can rapidly advance at periodic intervals through the program. Alternatively, the same function may be implemented in response to a user pressing and holding a fast forward or rewind button.

In another embodiment, dragging the slider of a media player application causes the system to toggle through successive still images. The rate at which the user drags the slider across the screen can be used by the system to determine the rate of display of successive still images.

Movement icon 320 indicates a speed of fast forward or rewind operation among multiple available speeds. In an embodiment, repeated selection of a fast forward button or rewind button on playback device 1002 causes the system to toggle through successively higher movement speeds for the current trick play mode (fast forward or rewind) until the highest movement speed is reached; selecting the same button again then causes returning to the lowest available movement speed for that trick play mode. As a movement speed changes, the movement icon 320 changes to illustrate the then-current speed.

Images move among different positions in screen display 302 at a greater or lesser speed depending on the selected movement of the progress bar. In an embodiment, a speed change may be accomplished by selectively skipping certain of the still images and not displaying them so that the program appears to be advancing more rapidly. Alternatively, a speed change may be accomplished by causing certain of the still frames in the first image position or the third image position never to be displayed in the second image position, but to jump directly to the opposite side of the screen into either the first image position or third image position as appropriate. For example, in the arrangement of FIG. 3A, to implement a faster speed still image 307A might move directly to the position of still image 301B or still image 301A, and might never appear in the second position 306. Alternatively, a speed change may be accomplished by changing the amount of time during which each of the still images is displayed on the screen—that is, the presentation time of the images. A combination of two or more of these techniques also may be used.

The rate of display of the still images may be used to give the appearance of faster or slower progression through the program material. For example, if still images have been collected at 10 second program intervals, then displaying one still per second gives the appearance of progressing through the program material at 10 times (10×) the normal viewing speed, displaying every second still image at two-thirds of a second per still gives the appearance of 30× speed, displaying every fourth still image at half second intervals gives the appearance of 80× speed, and so on. Thus, the rate of display of the still images may be used to hint at higher speeds of traversing the program material but does not stress the media processor in the way that displaying all the frames of the program material at the equivalent rate of display would stress the processor. Further, the progression techniques disclosed herein allow the user to easily discern when to stop progressing through the program material. In contrast, displaying all the frames of the program material at the equivalent rate of display often results in a screen image that is too blurry to discern any detail or hint of when to stop progressing through the material.

Progress bar 322 may illustrate a relative amount of the audiovisual media that has been played and may also include one or more markers, such as vertical bars, to indicate relative positions within program of the still images that are shown in display 302. One or more of the still images of display 302 may be indicated in the progress bar. For example, the progress bar 322 may comprise a marker only for the still image in the second image position 306.

In some embodiments, the progress bar is included within a slider component of a media player application. In such embodiments, the slider may be used to invoke trick-play operations by selecting and dragging the slider forward or backward using a cursor control device such as a mouse.

In an embodiment, chapter points within audiovisual media are represented using markers on progress bar 322. In an embodiment, as the user drags the slider of a media player application the progress bar "snaps" to the nearest chapter point in the direction the slider is being moved. The chapter points may be represented by still images, such as 301, 306, and 307. These chapter point images are usually provided in predetermined intervals, such as 10 second program intervals, as described above. The progress bar "releases" from the chapter point only after the user has moved the slider sufficiently far away from the marker representing the chapter point. A distinct audio signal may accompany the action of snapping progress bar 322 to a chapter point.

Figure 3C:
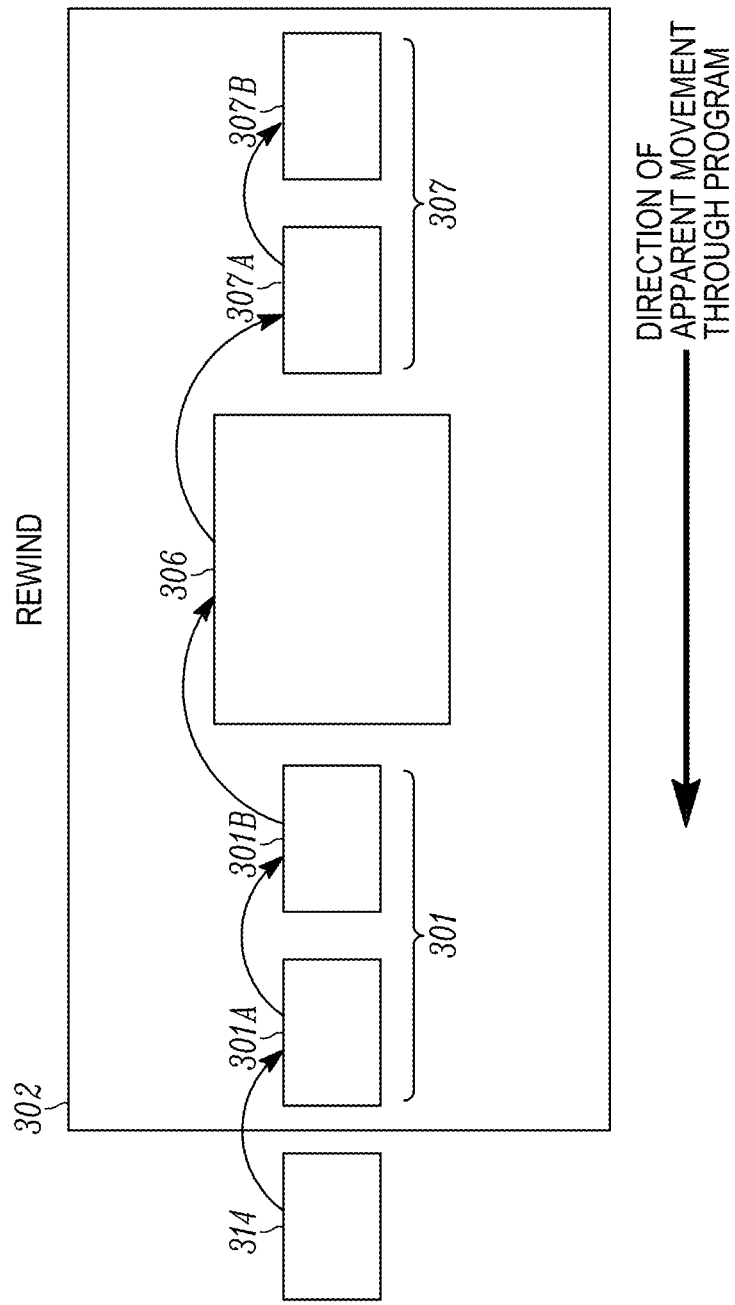
FIG. 3C illustrates movement of the still images of FIG. 3A in a rewind operation.

FIG. 3C illustrates movement of the still images of FIG. 3 in a rewind operation. When a rewind trick play mode is selected, the still images in screen display 302 move as indicated above for FIG. 3B but in an opposite direction. For example, a new still image 314 replaces still image 301A in position 301, and image 301A moves rightward to replace image 301B. Concurrently, image 301B moves into the second position 306. The image at second position 306 moves rightward to replace image 307A, which moves to replace image 307B. The previously displayed image 307B appears to disappear off the screen to the right. As a result, the display appears to be rewinding the audiovisual media to move through the program in the direction indicated by the arrow at the bottom of FIG. 3C.

In an embodiment, each still image that is displayed in the second image position 306 is displayed in a size larger than the sizes of images in first and second image positions 301, 307. This approach gives the second image position 306 more prominence and gives the user a focal point while still providing the user with image references in the first and second positions 301, 307 to indicate what came before and what comes next.

As described above, the user may move through an audiovisual media by skipping over chapter points that are represented by stored still images. Each of the still images is, for example, a JPG still graphical image and is not displayed directly from the video stream for the program. Consequently, the user is limited in how accurately they can navigate in an audiovisual media, with some limitations being, how frequently the images are stored as chapter points (e.g., 1 image every 10 seconds) and how long it takes the processor to re-buffer around the selected chapter point. Thus, it would be desirable to provide the ability to show frame-grabs from an audiovisual media that a user can directly jump to that position in the stream (e.g., local or streaming content).

Figure 4:
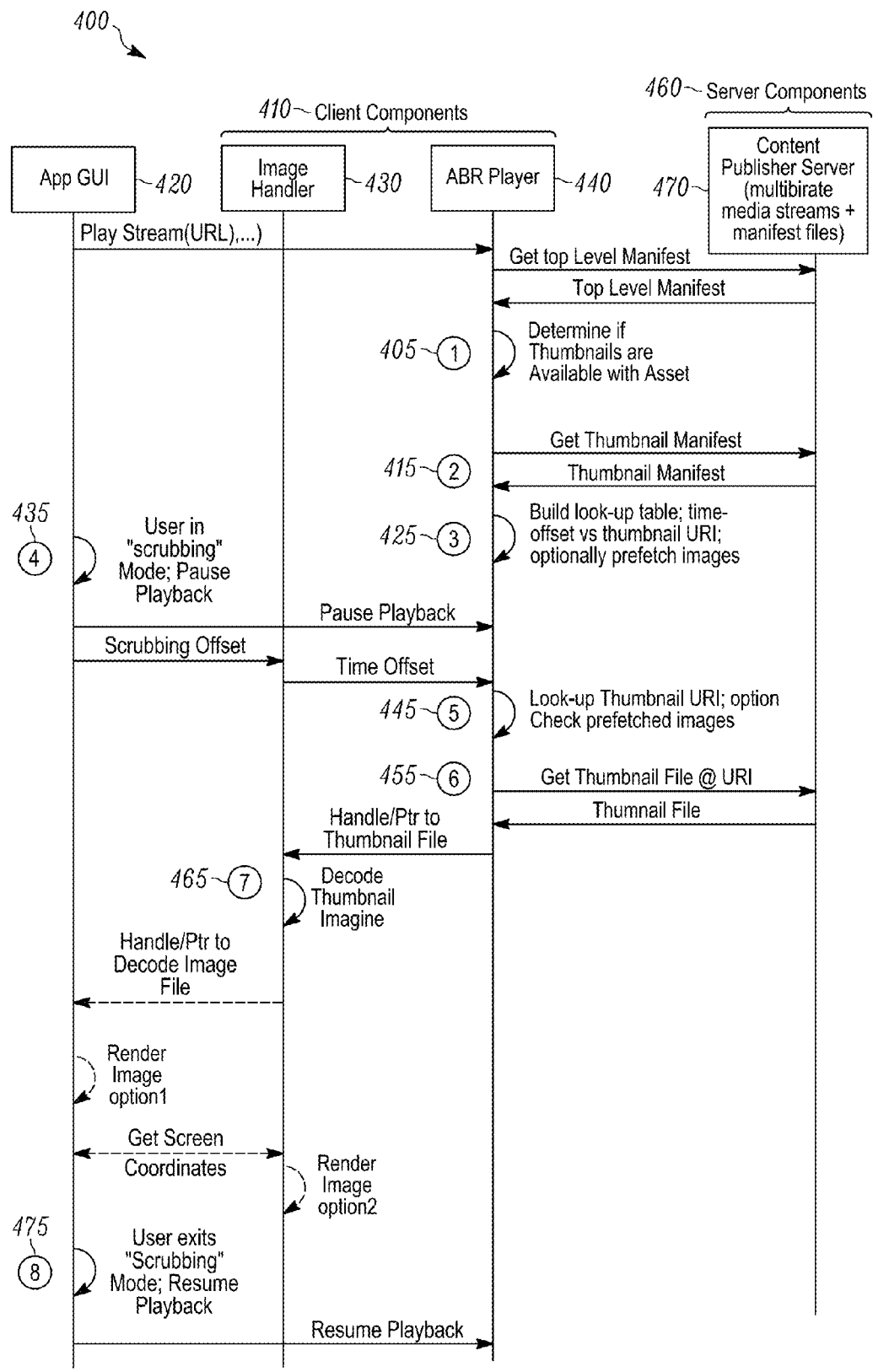
FIG. 4 illustrates a system that includes client components and server components in communication with each other and the message flows for handling thumbnail images in accordance with embodiments of the disclosure.

FIG. 4 provides such a desirable method for showing thumbnails of different chapters available for an audiovisual media or movie. For example, by clicking on the thumbnail, removing finger from the slider, or moving cursor off the progress bar where thumbnails are displayed, the user can directly jump to that position in the stream. In some embodiments, a sequence of separately or independently generated thumbnail images stored on a server. An HLS client may retrieve the thumbnail images and display them when the user moves the progress bar.

Referring to FIG. 4, a system 400 is shown that includes client components 410 and server components 460 in communication with each other and the message flows for handling thumbnail images when the user enters "scrubbing mode" during the playback of an audiovisual media asset. As used herein, scrubbing mode refers to moving rapidly forward or backward through a video file, while only displaying a subset of the content.

Client components 410 may include an App GUI 420, an image handler 430, and an ABR player 440. Server components 460 may include a content publishing server 470, which may be configured to produce multi-bitrate media steams and manifest files.

In some embodiments, the App GUI 420 shows a graphical overlay with the progress bar and playback location indicator. The location of the seek button on the progress bar is obtained and passed to image handler 430 when the user is in "scrubbing mode". In some embodiments, a user may enter scrubbing mode by: (a) a user presses their finger on the playback button and drags it in any direction along the progress bar, or b) using a mouse/cursor to drag a playback button on the progress bar, etc. These actions may trigger the App GUI to enter 'scrubbing' mode and display thumbnails. Similarly, when the user lifts their finger from the playback button or removes the mouse cursor, the App GUI may signal to go into playback mode corresponding to the media segment start indicated by the last thumbnail.

Generally, when the user enters "scrubbing" mode, playback will be paused and the thumbnail images will be rendered as per predetermined requirements (e.g., location, size, resolution). Once it is determined that the user is no longer in "scrubbing" mode, a play command will be issued by App GUI 420 and the ABR player 440 will resume playing video from the beginning of the media segment corresponding to the last displayed thumbnail image.

In some embodiments, image handler 430 is responsible for receiving a time offset from App GUI 420 and passing it to ABR player 440. Once a thumbnail image is available, image handler 440 may be configured to decode the thumbnail image and provide a pointer or handle to App GUI 420 so it can render it at the appropriate location on the screen. Alternatively, the image handler 430 could render the image based on coordinates provided by App GUI 420.

In some embodiments, ABR player 440 may be configured to parse information related to the thumbnail image manifest file. For example, ABR player 440 may be responsible for loading the thumbnail image m3u8 file and building a look-up table of time offsets to corresponding thumbnail uniform resource identifiers (URIs). The look-up file may map time offsets of the thumbnail images to the beginning of the corresponding time or media sequence number of media segments. In some embodiments, it may be desirable to pre-fetch thumbnail images based on the current play position (some duration+/−current playtime).

In some embodiments, a collection of thumbnail images for an audiovisual media asset are generated during media asset HLS transcoding, described in FIG. 2. The thumbnail images may be published with the HLS asset. In some embodiments, each thumbnail image may correspond to the first reference frame (e.g., such as an instantaneous decoder refresh (IDR) frame) of an HLS video segment or chunk.

In one example, where content is prepared for ABR playback on a tablet device (7-10" diagonal screen size), the thumbnail resolution can be optimized for the tablet, e.g., 208×116 pixels. In some embodiments, thumbnail images are not encrypted. In some embodiments, one set of thumbnail images may be used for an audiovisual media asset; thumbnails of varying quality/resolution need not be generated. Generally, the thumbnail images may be compressed using standard image formats, e.g. JPEG or JPG. It can be appreciated that the optimized size of the thumbnail images, when compressed, has very small file sizes and can be downloaded rapidly from a server.

The collection of thumbnail images may be stored with the multi-bitrate adaptive media stream files on server 470. The presence of thumbnail images may be signaled via the master playlist of the HLS VOD audiovisual media asset. For example, in some embodiments, a proprietary tag in the top level manifest that indicates that a thumbnail manifest file is present. If the ABR player 440 or image handler 430 recognizes the tag, then the thumbnails may be retrieved. For example, an additional STREAM-INF tag with CODECS="jpeg" may be used. The associated URI points to an "m3u8" file containing the sequence of thumbnail files.

In some embodiments, the thumbnails have been compressed when published to the server 470 and the image handler 430 may be configured to decode/decompress them. In some embodiments, the ABR player 440 may be configured to recognize a 'tag' in the high-level manifest file indicating that thumbnails are present. In some embodiments, the image handler 430 may be configured to recognize the 'tag' in the high-level manifest file indicating that thumbnails are present.

In a first step 405, ABR player 440 is configured to receive a top level manifest for the audiovisual media asset. In some embodiments, ABR player 440 may be configured to determine if there is a tag, indicating a thumbnail image manifest file.

If present, at next step 415, the ABR player 440 may be configured to request/receive the thumbnail manifest file from the server 470. At next step 425, the ABR player 440 may be configured to build a look-up table with the corresponding thumbnail URLs with a time offset or a segment number within the audiovisual media. In some embodiments, the ABR player 440 may be configured to launch a "background" task to retrieve all the thumbnail images and cache them on the player 440.

The retrieval of the thumbnail images by a background task may initially download a subset of the entire image collection that is equally spaced across the entire media asset. This 'coarse-grained' coverage of thumbnail images across the duration of the media asset can be downloaded and cached rapidly by the player. This is useful if the user starts seeking across the media asset and needs to have some thumbnail images available. The remainder of the thumbnail images can be downloaded in the background when there is available CPU capacity. These remaining thumbnails provide 'fine-grained' coverage over the asset for more accurate playback positioning. Using small optimized thumbnail image sizes are effective for seeking and can be rendered quickly by the ABR player for a very responsive user experience. The small thumbnail image sizes can be cached on the ABR player efficiently since they do not require much memory and can be downloaded rapidly from a server due to very low bandwidth requirements.

Step 435 shows the user during playback of an audiovisual media asset. At step 435, the user enters a scrubbing mode. In some embodiments, scrubbing mode can be entered when the user drags a playback indicator along a progress bar by e.g., either pressing the device screen or using a mouse. Once the user enters scrubbing mode, the playback may be paused. As shown, a time offset position or segment number of the current position location may be passed to the image handler 430. Image handler 430 may be configured to request the ABR player 440 for the thumbnail corresponding to the time offset position or segment number.

At step 445, the ABR player 440 may be configured to look up the thumbnail file corresponding to the time offset. At step 455, the ABR player 440 may be configured to request/receive the thumbnail file from the server 470. In some embodiments, ABR player 440 may be configured to additionally or optionally determine if the thumbnail file has cached on ABR player 440.

In some embodiments, at step 465, a software handler or pointer may be provided to the image handler 430 of the thumbnail file. The image handler 430 may be configured to decode/decompress the thumbnail image. In some embodiments, the image handler 430 may provide a pointer to the App GUI 420 to render the thumbnail image or alternatively, the image handler 430 may be configured to render the thumbnail image based on screen coordinates determined by the App GUI 420. The screen coordinates for placement of rendered thumbnail images may be preconfigured in the App GUI 420.

In some embodiments, as the user moves the progress bar, a sequence of thumbnails may be presented according to the time offsets. This thumbnail production is provided in further detail in the discussion of FIG. 5, below.

At step 475, after the user has stopped moving the playback indicator or pressed "play", the App GUI 420 may be configured to signal the ABR player 440 to resume playing at the point corresponding to the last position of the playback indicator. The media segment which begins with the location offset corresponding to the thumbnail image is requested from the content server. The thumbnails are then removed from the screen and the media segments begin to play.

Figure 5:
FIG. 5 illustrates a progress bar and how thumbnail images may be presented to a user in accordance with embodiments of the disclosure.

FIG. 5 shows an example of a slider and/or progress bar 520 and how thumbnail images may be presented to a user when implementing the methods described in FIG. 2 and FIG. 4. FIG. 5 includes a screen display 502 on a video monitor or similar device. In the background 510 of screen display 502, a movie is currently playing. In the foreground of screen display 502, a user has selected to scroll over the screen display 502, prompting a progress bar 520 to appear.

The user has selected to enter scrubbing mode or navigate within the movie in background 510, and a chapter point 530 is shown to be selected. Chapter point 530 is associated with a specific time stamp of the movie showing. Paired with and corresponding to chapter point 530 is thumbnail image 540.

In some embodiments, thumbnail images may be retrieved at a fixed interval (e.g. a certain percentage of the entire media playback time). As an example, thumbnail images corresponding to the entire range of the media duration are quickly downloaded and saved by the ABR player to provide coarse coverage for chapter points. A subset of 100 thumbnails, each spaced one percentage of the entire media duration, can be downloaded and cached quite rapidly by the ABR player 440 to provide coarse chapter points spanning the entire media duration.

In some embodiments, the coarse coverage thumbnail images are sent to a client 410 or playback device in association with the download of media files at the beginning of the playback session. During times when the processor 120 is not operating at capacity, additional thumbnail images may be retrieved (as shown in FIG. 4) and cached/saved by the ABR player to fill in more detail for the chapter points. Saving or caching the images in the ABR player allows for very responsive, low latency rendering of thumbnail images, when user enters "scrubbing" mode. Thus, the entire duration of the movie or audiovisual media asset may be covered, with the details for shorter time intervals (e.g., more precise alignment of thumbnail images) filled in as processing requirements allow.

Benefits associated with the present methods include: in an adaptive streaming environment, thumbnail images are made available in the framework used to retrieve manifest files and media segment files, the thumbnail images are aligned with the adaptive media segments for quick seek operations, lower resolution images for thumbnails may be used for minimum bandwidth download (e.g., more bandwidth efficient than downloading entire media segments or complete I-frames from a server), and the optional caching of images provides for a very low latency response to viewing thumbnails opposed to an implementation that would do partial HTTP Gets of media segments from a server.

In some embodiments, when the user enters scrubbing mode, the video playback will be paused and thumbnail images will be overlaid on the video, as shown in FIG. 5. The rendering of thumbnail images over the screen display 502 may be at a predetermined location (coordinate offset) and resolution.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method, comprising:
   receiving a top level manifest file for a media asset, the media asset comprising an adaptive rate streamed video;
   selecting a media segment file from the media asset having a predetermined bitrate from the top level manifest file;
   receiving a first collection of thumbnail images corresponding to the media segment file, the first collection of thumbnail images corresponding to images that coarsely represent chapters throughout the duration of the media segment file; and
   receiving a second collection of thumbnail images corresponding to the media segment file, the second collection of thumbnail images corresponding to images that more finely represent chapters throughout the duration of the media segment file, wherein the first collection and second collection of thumbnail images are received at different times;
   using the first collection of thumbnail images to display for a user to identify video segments for playback when video receive speed is limited and the second collection of thumbnail images is not available;
   using the second collection of thumbnail images to display for a user to identify video segments for playback when video receive speed is available to create the second collection of thumbnail images;
   receiving a third collection of thumbnail images corresponding to the media segment file, the third collection of thumbnail images corresponding to images that more finely represent chapters throughout the duration of the media segment file;
   wherein the first and second collections of thumbnail images are provided for display to the user when bandwidth is not sufficient to allow the third collection of thumbnail images to be created; and
   using the third collection of thumbnail images to display for a user to identify video segments for playback when video receive speed is sufficient to allow all of the first, second and third collections of thumbnail images.

2. The method of claim 1, wherein a tag in the top level manifest file indicates if the first collection of thumbnail images is available.

3. The method of claim 1, further comprising: pairing each thumbnail image within the first collection of thumbnail images with a time offset or a segment number corresponding to a media segment starting point.

4. The method of claim 3, wherein each thumbnail image is paired using a uniform resource locator (URL) for the thumbnail image.

5. The method of claim 3, wherein the pairing is performed using a look-up table.

6. The method of claim 1, wherein said receiving the second collection of thumbnail images is performed as a background task when processor capacity is available.

7. The method of claim 1, wherein the first collection of thumbnail images comprises a collection of 100 thumbnail images that span from the beginning of the media segment to the end of the media segment.

8. The method of claim 1, wherein the second collection of thumbnail images comprises a collection of thumbnail images that are periodically spaced at a time interval corresponding to a duration of corresponding media files, the thumbnail images spanning from the beginning to the end of an entire audiovisual media.

9. The method of claim 1, wherein the first collection and second collection of thumbnail images are compressed using a standard format.

10. A system, comprising an adaptive bitrate (ABR) player, the ABR player comprising:
    a processor for receiving a streaming ARB video; and
    a memory connected to the processor, the memory storing code to cause the processor to perform the following steps:
    receive a top level manifest file for a media asset;
    select a media segment file having a predetermined bitrate from the top level manifest file;
    receive a first collection of thumbnail images corresponding to the media segment file, the first collection of thumbnail images corresponding to images that coarsely represent chapters throughout the duration of the media segment file; and receive a second collection of thumbnail images corresponding to the media segment file, the second collection of thumbnail images corresponding to images that more finely represent chapters throughout the duration of the media segment file,
   wherein the first collection and second collection of thumbnail images are received at different times;
   wherein the first collection of thumbnail images are used to display for a user to identify video segments for playback when video receive speed is limited and the second collection of thumbnail images is not available; and
   wherein the second collection of thumbnail images are used to display for a user to identify video segments for playback when video receive speed is available to create the second collection of thumbnail images;
receive a third collection of thumbnail images corresponding to the media segment file, the third collection of thumbnail images corresponding to images that more finely represent chapters throughout the duration of the media segment file;
   wherein the first and second collections of thumbnail images are provided for display to the user when bandwidth is not sufficient to allow the third collection of thumbnail images to be created; and
use the third collection of thumbnail images to display for a user to identify video segments for playback when video receive speed is sufficient to allow all of the first, second and third collections of thumbnail images.

11. The system of claim 10, wherein the ABR player is further configured to: perform bandwidth availability estimation prior to selecting a media segment file having a predetermined bitrate.

12. The system of claim 10, wherein the ABR player is further configured to: receive a second level manifest file for the media asset.

13. The system of claim 12, wherein the ABR player is further configured to: determine the media segment file from the second level manifest file.

14. The system of claim 10, wherein the ABR player is further configured to: receive multiple media files in succession.

15. The system of claim 10, wherein the ABR player is further configured to: determine if bandwidth availability changes and adjusting media file segment selection based on available bandwidth.

16. The system of claim 10, wherein the ABR player is further configured to: recognize a tag in the top level manifest file, wherein the tag indicates that thumbnail images are available for retrieval.

17. The system of claim 10, further comprising: an image handler in communication with the ABR player, the image handler configured to: recognize a tag in the top level manifest file, wherein the tag indicates that thumbnail images are available for retrieval.

18. The system of claim 17, wherein the image handler is further configured to: decompress the first collection and second collection of thumbnail images.

19. The system of claim 10, further comprising: an application graphic user interface (GUI) in communication with the ABR player, the GUI configured to: provide a progress bar and playback location indicator to a user.

* * * * *